US009152393B1

(12) United States Patent
Mani et al.

(10) Patent No.: US 9,152,393 B1
(45) Date of Patent: Oct. 6, 2015

(54) DYNAMIC ENTITIES FOR A MODEL OF A GRAPHICAL MODELING ENVIRONMENT

(71) Applicant: The MathWorks, Inc., Natick, MA (US)

(72) Inventors: Ramamurthy Mani, Wayland, MA (US); Saurabh Mahapatra, Shrewsbury, MA (US); Wei Li, Framingham, MA (US); Omar A. Orqueda, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 248 days.

(21) Appl. No.: 13/693,490

(22) Filed: Dec. 4, 2012

Related U.S. Application Data

(60) Provisional application No. 61/567,456, filed on Dec. 6, 2011.

(51) Int. Cl.
G06F 9/44 (2006.01)
(52) U.S. Cl.
CPC .................................... G06F 8/35 (2013.01)
(58) Field of Classification Search
None
See application file for complete search history.

(56) References Cited

U.S. PATENT DOCUMENTS

| 5,608,908 | A | * | 3/1997 | Barghouti et al. | 719/318 |
|---|---|---|---|---|---|
| 7,519,523 | B2 | * | 4/2009 | Szpak et al. | 703/13 |
| 7,558,721 | B2 | * | 7/2009 | Szpak et al. | 703/14 |
| 7,743,361 | B2 | * | 6/2010 | Clark | 717/105 |
| 7,761,273 | B2 | * | 7/2010 | Szpak et al. | 703/13 |
| 7,925,477 | B2 | * | 4/2011 | Clune | 703/6 |
| 8,024,167 | B2 | * | 9/2011 | Szpak et al. | 703/13 |
| 8,135,570 | B2 | * | 3/2012 | Linebarger et al. | 703/13 |
| 8,260,597 | B1 | * | 9/2012 | Raghavan et al. | 703/13 |
| 8,336,025 | B1 | * | 12/2012 | Hosagrahara et al. | 717/111 |
| 8,527,941 | B2 | * | 9/2013 | Clark | 717/105 |
| 8,577,652 | B2 | * | 11/2013 | Oh | 703/6 |
| 8,627,272 | B1 | * | 1/2014 | Lin et al. | 717/104 |
| 2004/0205045 | A1 | * | 10/2004 | Chen et al. | 707/3 |
| 2004/0230404 | A1 | * | 11/2004 | Messmer et al. | 703/1 |
| 2007/0106489 | A1 | * | 5/2007 | Eryilmaz | 703/22 |
| 2010/0029390 | A1 | * | 2/2010 | Wei | 463/43 |
| 2010/0211374 | A1 | * | 8/2010 | Szpak et al. | 703/21 |
| 2010/0257506 | A1 | * | 10/2010 | Clark | 717/105 |
| 2012/0005661 | A1 | * | 1/2012 | Johnston et al. | 717/148 |
| 2012/0084069 | A1 | * | 4/2012 | Clune et al. | 703/17 |

OTHER PUBLICATIONS

"Multimethod Simulation Software—The Only Simulation Tool that Supports Discrete Event, Agent Based and System Dynamics Simulation", Any Logic Simulation Software, www.anylogic.com, Print date—Nov. 12, 2012, pp. 1-10.
"The Ptolemy Project—Heterogeneous Modeling and Design", UC Berkeley EECS Dept., Ptolemy Project Home Page, Ptolemy.eecs.berkeley.edu, Print date—Nov. 12, 2012, pp. 1-5.

* cited by examiner

Primary Examiner — Don Wong
Assistant Examiner — Roberto E Luna
(74) Attorney, Agent, or Firm — Harrity & Harrity, LLP

(57) ABSTRACT

A device receives a dynamic system model for a graphical modeling environment, and associates an entity with the dynamic system model, the entity including an entity model. The device defines at least one of a parameter, a configuration, or a solver setting for the entity model, and performs a simulation of the dynamic system model. The device generates a system event during the simulation of the dynamic system model, and modifies at least one of the parameter, the configuration, or the solver setting for the entity model based on the system event.

20 Claims, 13 Drawing Sheets

DYNAMIC ENTITIES FOR A MODEL OF A GRAPHICAL MODELING ENVIRONMENT

RELATED APPLICATION

This application claims priority under 35 U.S.C. §119 based on U.S. Provisional Patent Application No. 61/567,456, filed Dec. 6, 2011, the disclosure of which is incorporated by reference herein in its entirety.

BRIEF DESCRIPTION OF THE DRAWINGS

The accompanying drawings, which are incorporated in and constitute a part of this specification, illustrate one or more implementations and, together with the description, explain these implementations. In the drawings.

DETAILED DESCRIPTION

The following detailed description refers to the accompanying drawings. The same reference numbers in different drawings may identify the same or similar elements.

A technical computing environment (TCE) may provide a computing environment that allows users to perform tasks related to disciplines, such as, but not limited to, mathematics, science, engineering, medicine, business, etc., more efficiently than if the tasks were performed in another type of computing environment, such as an environment that requires the user to develop code in a conventional programming language, such as C++, C, Fortran, Pascal, etc. In one example, a TCE may include a dynamically-typed programming language (e.g., the M language, a MATLAB® language, a MATLAB-compatible language, a MATLAB-like language, etc.) that can be used to express problems and/or solutions in mathematical notations.

The TCE may provide a graphical programming or modeling environment (e.g., a block diagram environment) that generates a dynamic system model. The dynamic system model may include multiple entities. For example, if the dynamic system model simulates an automobile factory, entities may be created for the parts used to manufacture automobiles. However, such entities are static objects with data (e.g., attributes) that cannot be modified.

OVERVIEW

Systems and/or methods described herein may provide dynamic entities for a dynamic system model of a graphical modeling environment (e.g., a TCE). In one example, the dynamic system model may include blocks that represent an overall dynamic system to be simulated (e.g., an airport, a factory floor, etc.). The dynamic entities may include individual objects (e.g., an aircraft, a part, a robot, etc.) that may flow through the overall dynamic system. The dynamic entities may include models with parameters, configurations, solver settings, etc. that may be modified by a user of the TCE and/or based on system events (e.g., an airport runway may shut down) generated by the dynamic system model. Alternatively, or additionally, the dynamic entities may generate entity events (e.g., an aircraft may arrive at an airport) that may modify a behavior of the dynamic system model.

Figure 1:
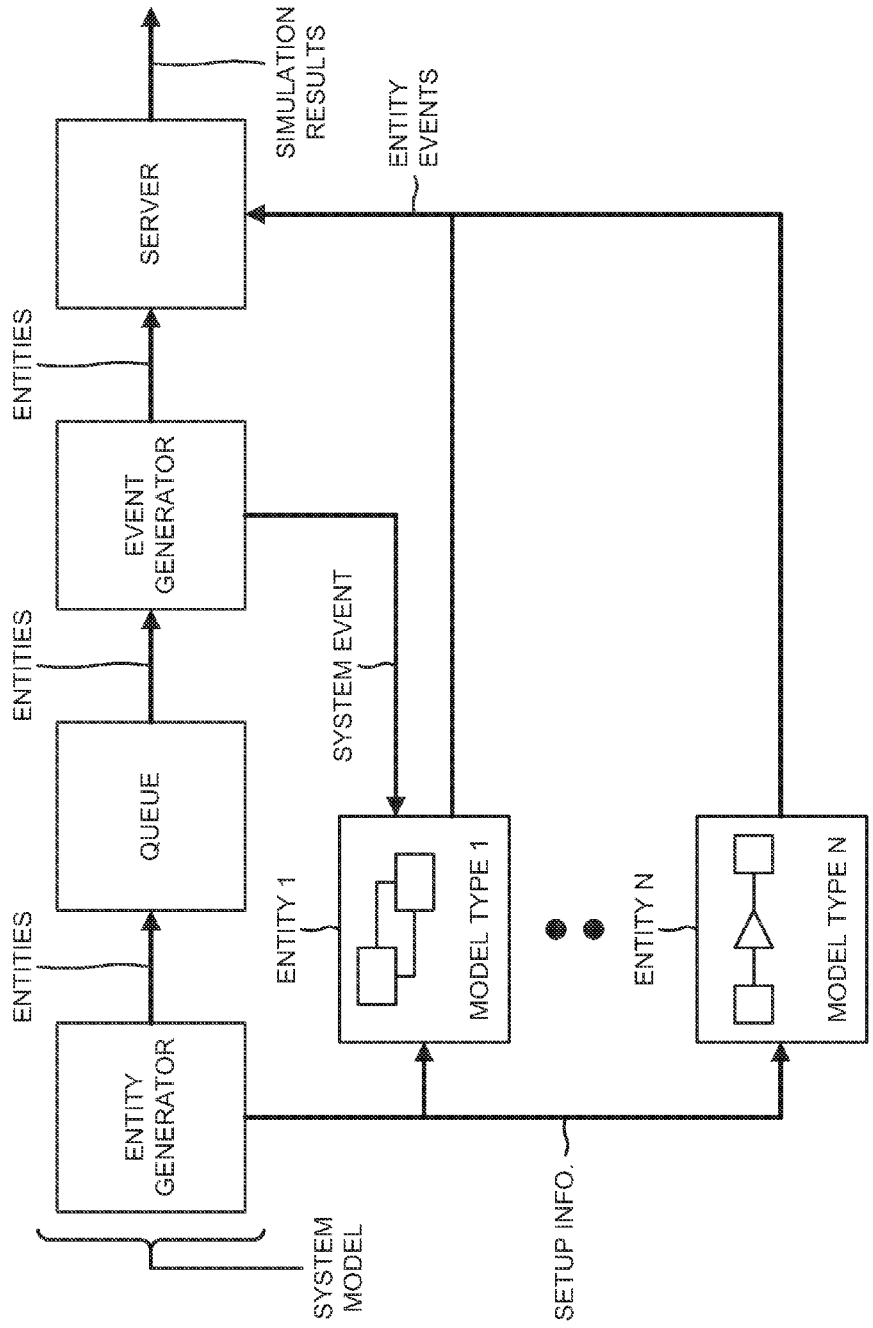
FIG. 1 is a diagram of an overview of an example implementation described herein.

FIG. 1 is a diagram of an overview of an example implementation described herein. As shown in FIG. 1, a computing environment, such as a TCE, may generate a dynamic system model. The dynamic system model may include a block diagram model with one or more model elements (e.g., blocks), one or more inputs, and one or more outputs. Each of the model elements may include a representation (e.g., a block) of a hardware device, a system, a subsystem, etc. of a system being modeled by the TCE. In one example, the dynamic system model may include an entity generator block, a queue block, an event generator block, and a server block.

The entity generator block may generate one or more dynamic entities (e.g., entity 1 through entity N) for the dynamic system model. The entities may include individual objects (e.g., an aircraft, a part, a robot, etc.) that may flow through the dynamic system model. Each of the entities may include an entity model of a particular type (e.g., model type 1 through model type N). For example, the entity model may include a tool used to model systems via state machines and flow charts; a tool to model, simulate, and analyze dynamic systems; a tool to model and simulate physical systems; etc. The entity generator block may provide setup information to each of the entities, such as model parameters, model configurations, model solver settings, etc. The entity generator block may provide the entities to the queue block.

The queue block may receive the entities, and may place the entities in a queue. For example, if the dynamic system model is an airport, the queue block may place information associated with an aircraft in a queue for awaiting takeoff from the airport. An entity may remain in the queue until the dynamic system model determines that the entity is to be further utilized by the dynamic system model. The queue block may provide one or more of the entities to the event generator block when requested by the dynamic system model.

The event generator block may receive the entities, and may generate system events based on information associated with the entities and/or based on simulation of the dynamic system model. A system event may include an event that affects the dynamic system model. For example, if the dynamic system model is a factory floor, the system event may include a new machine coming online for the factory floor. The event generator block may provide the system events to one or more of the entities. The entities receiving the system events may modify the setup information (e.g., the parameters, configurations, solver settings, etc. for the entity models) based on the system events. The event generator block may provide the entities and/or the system events to the server block.

The server block may receive the entities and/or the system events from the event generator block, and may receive entity events generated by the entities. An entity event may modify behavior of the dynamic system model, and may include an event that is generated based on changing conditions in an entity model (e.g., an aircraft may unload passengers). The server block may generate simulation results based on the entities, the system events, and/or the entity events. In one example, the simulation results may include code generated from the dynamic system model.

The terms "code" and "program code," as used herein, are to be used interchangeably and are to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

Example Environment Arrangement

Figure 2:
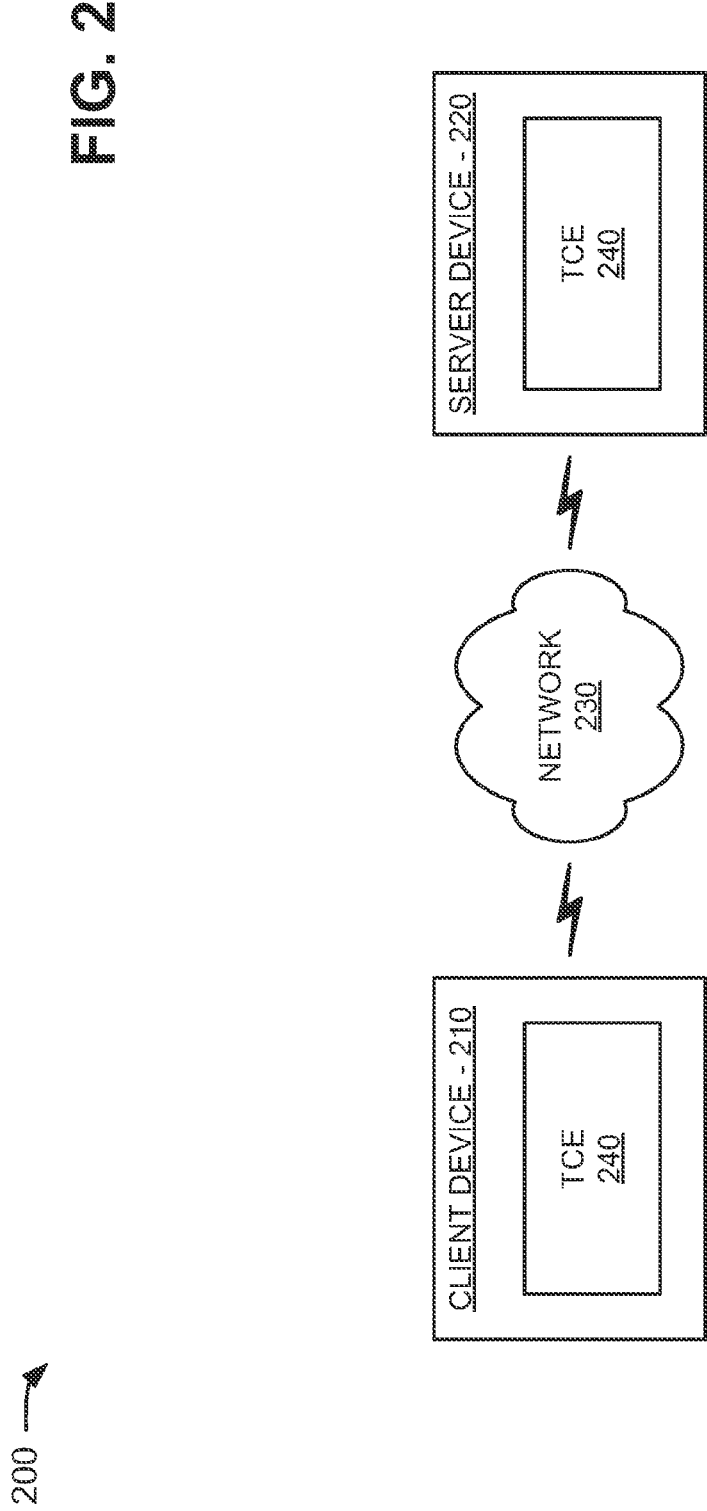
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections. A single client device 210, server device 220, and network 230 have been illustrated in FIG. 2 for simplicity. In practice, environment 200 may include more client devices 210, server devices 220, and/or networks 230. In one example implementation, client device 210 and server device 220 may be provided in a single device or may be provided in separate devices.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

Server device 220 may include one or more server devices, or other types of computation and communication devices, that gather, process, and/or provide information in a manner described herein. Server device 220 may include a device that is capable of communicating with client device 210 (e.g., via network 230). In one example, server device 220 may include one or more laptop computers, personal computers, workstation computers, servers, central processing units (CPUs), graphical processing units (GPUs), application-specific integrated circuits (ASICs), field-programmable gate arrays (FPGAs), etc. and/or software (e.g., a simulator) executing on the aforementioned devices. In one example, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN), an intranet, the Internet, or a combination of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In one implementation, TCE 240 may provide these functions and/or tools using toolboxes (e.g., toolboxes for signal processing, image processing, data plotting, parallel processing, etc.). Alternatively, or additionally, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhpsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3].

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in other implementations, environment 200 may include fewer components, different components, differently arranged components, and/or additional components than those depicted in FIG. 2. Alternatively, or additionally, one or more components of environment 200 may perform one or more other tasks described as being performed by one or more other components of environment 200.

Example Device Architecture

Figure 3:
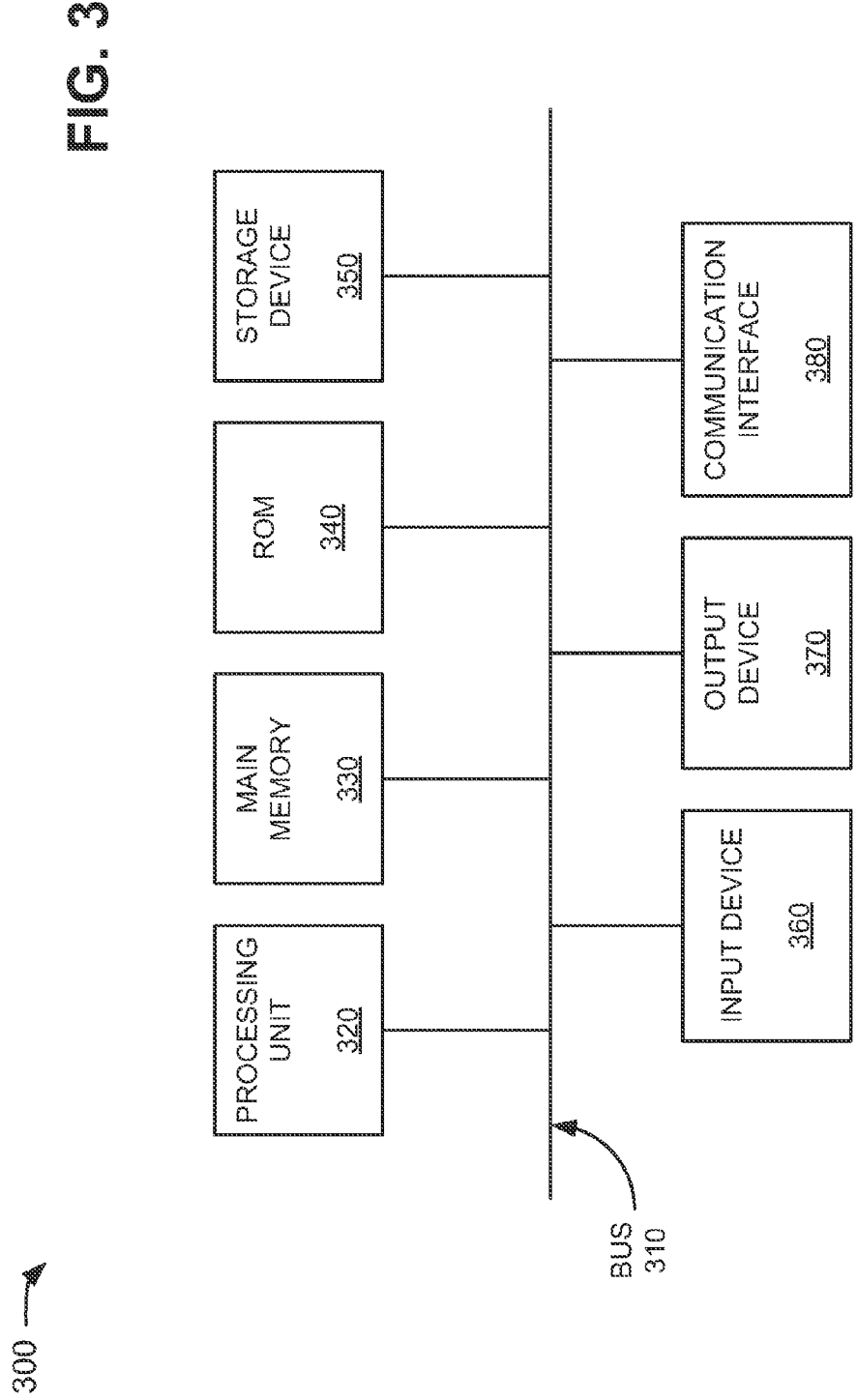
FIG. 3 is a diagram of example components of one or more of the devices of the environment depicted in FIG. 2.

FIG. 3 is an example diagram of a device 300 that may correspond to one or more of the devices of environment 200.

As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

Example Technical Computing Environment

Figure 4:
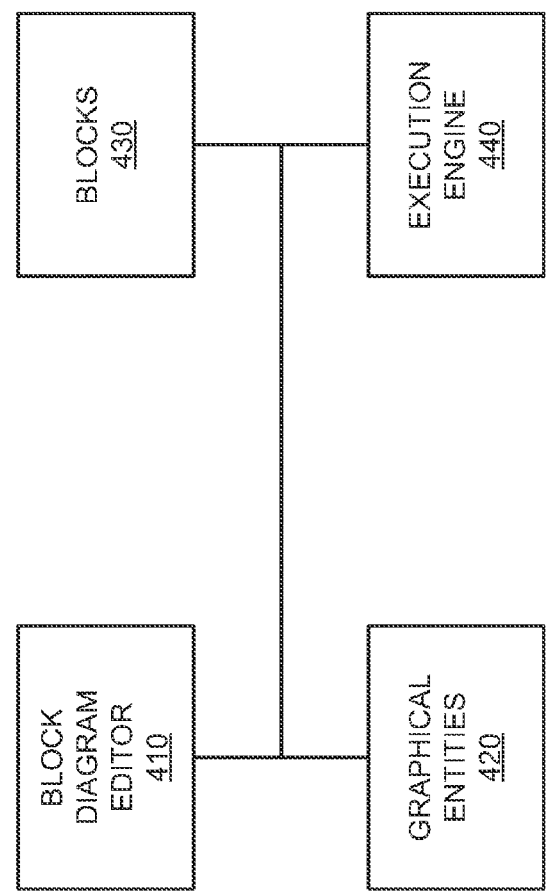
FIG. 4 is a diagram of example functional components of a technical computing environment (TCE) that may be used by one or more of the devices of the environment depicted in FIG. 2.

FIG. 4 is a diagram of example functional components of TCE 240. In one implementation, the functions described in connection with FIG. 4 may be performed by one or more components of device 300 (FIG. 3) and/or by one or more devices 300. As shown in FIG. 4, TCE 240 may include a block diagram editor 410, graphical entities 420, blocks 430, and/or an execution engine 440.

Block diagram editor 410 may include hardware or a combination of hardware and software that may be used to graphically specify models of dynamic systems. In one implementation, block diagram editor 410 may permit a user to perform actions, such as construct, edit, display, annotate, save, and/or print a graphical model (e.g., a block diagram that visually and/or pictorially represents a dynamic system). In another implementation, block diagram editor 410 may permit a user to create and/or store data relating to graphical entities 420.

A textual interface may be provided to permit interaction with block diagram editor 410. A user may write scripts that perform automatic editing operations on a model using the textual interface. For example, the textual interface may provide a set of windows that may act as a canvas for the model, and may permit user interaction with the model. A model may include one or more windows depending on whether the model is partitioned into multiple hierarchical levels.

Graphical entities 420 may include hardware or a combination of hardware and software that may provide entities (e.g., signal lines, buses, etc.) that represent how data may be communicated between functional and/or non-functional units and blocks 430 of a model. Blocks 430 may include fundamental mathematical elements of a block diagram model.

Execution engine 440 may include hardware or a combination of hardware and software that may process a graphical model to produce simulation results, may convert the graphical model into executable code, and/or may perform other analyses and/or related tasks. In one implementation, for a block diagram graphical model, execution engine 440 may translate the block diagram into executable entities (e.g., units of execution) following the layout of the block diagram. The executable entities may be compiled and/or executed on a device (e.g., client device 210) to implement the functionality specified by the model.

Graphical models may include entities with relationships between the entities, and the relationships and/or the entities may have attributes associated with them. The entities may include model elements, such as blocks 430 and ports. The relationships may include model elements, such as lines (e.g., connector lines) and references. The attributes may include model elements, such as value information and meta information for the model element associated with the attributes. Graphical models may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks (e.g., blocks 430) connected by lines (e.g., connector lines). The blocks may consist of elemental dynamic systems, such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks (e.g., blocks 430). A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks (e.g., blocks 430) may be causal and/or non-causal. For example, a model may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port, and the connection with the input port of the data logging block may make this value available to the data logging block.

A sample time may be associated with the elements of a graphical model. For example, a graphical model may include a block (e.g., block 430) with a continuous sample time, such as a continuous-time integration block that may integrate an input value as a time of execution progresses. This integration may be specified by a differential equation. During execution, the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a graphical model may include a block (e.g., block 430) with a discrete sample time such as a unit delay block that may output values of a corresponding input after a specific delay. This delay may be a time interval, and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block (e.g., block 430) with an asynchronous sample time, such as a function-call generator block that may schedule a connected block to be evaluated at a non-periodic time. During execution, a function-call generator block may evaluate an input, and, when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. For example, the graphical model may include a block (e.g., block 430), such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks (e.g., blocks 430) where an output of the first of the two unit delay blocks is connected to an input of the second of the two unit delay block. The sample time of the first unit delay block may be inferred from the sample time of the second unit delay block. This inference may be performed by propagation of model element attributes such that, after evaluating a sample time attribute of the second unit delay block, a graph search proceeds by evaluating a sample time attribute of the first unit delay block since the first unit delay block is directly connected to the second unit delay block.

The values of attributes of a graphical model may be set to characteristics settings, such as one or more inherited settings, one or more default settings, etc. For example, the data type of a variable that is associated with a block (e.g., block 430) may be set to a default, such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In the case of an inherited sample time, a specific sample time may be inferred based on attributes of elements that the graphical model comprises and/or attributes of the graphical model (e.g., a fundamental execution period).

Although FIG. 4 shows example functional components of TCE 240, in other implementations, TCE 240 may include fewer functional components, different functional components, differently arranged functional components, and/or additional functional components than depicted in FIG. 4. Alternatively, or additionally, one or more functional components of TCE 240 may perform one or more other tasks described as being performed by one or more other functional components of TCE 240.

Example Technical Computing Environment Operations

Figure 5:
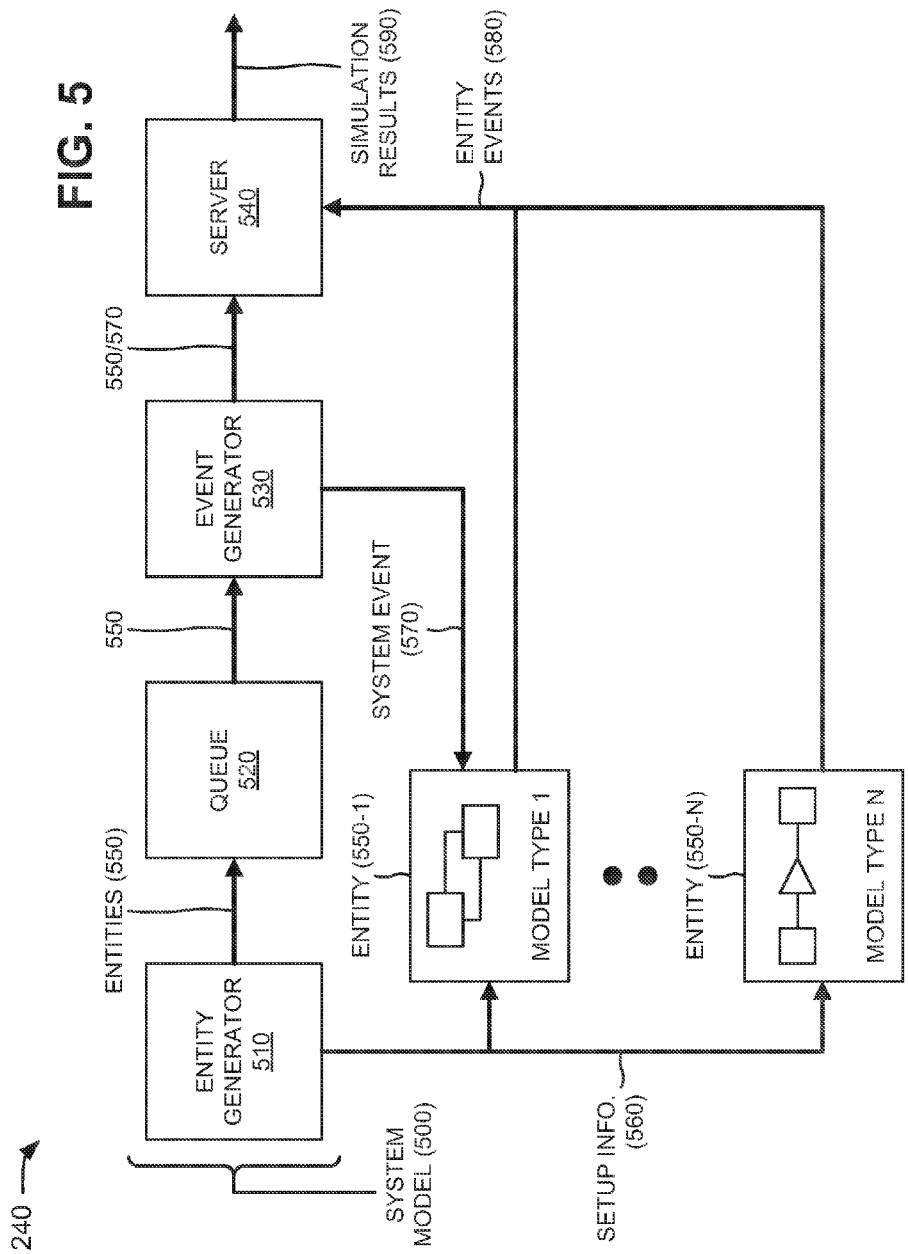
FIG. 5 is a diagram of example operations capable of being performed by the TCE.

FIG. 5 is a diagram of example operations capable of being performed by TCE 240. TCE 240 may include the features described above in connection with, for example, one or more of FIGS. 1-4. The functions described in connection with FIG. 5 may be performed by one or more components of device 300 (FIG. 3) and/or by one or more devices 300.

As further shown in FIG. 5, TCE 240 may generate a dynamic system model 500. Dynamic system model 500 may include a block diagram model with one or more model elements (e.g., blocks), one or more inputs, and one or more outputs. Each of the model elements may include a representation (e.g., a block) of a hardware device, a system, a subsystem, etc. of a system being modeled by TCE 240. In one example, dynamic system model 500 may include an entity generator block 510, a queue block 520, an event generator block 530, and a server block 540.

Entity generator block 510 may generate one or more dynamic entities 550-1 through 550-N (collectively referred to herein as "entities 550," and, in some instances, singularly as "entity 550") for dynamic system model 500. Entities 550 may include a representation of individual objects (e.g., representations of an aircraft, a part, a robot, etc.) that may flow through dynamic system model 500. Each of entities 550 may include an entity model of a particular type (e.g., model type 1 through model type N). The entity model types may be the same or different for one or more of entities 550. In one example, the entity model may include a tool used to model systems via state machines and flow charts; a tool to model, simulate, and analyze dynamic systems; a tool to model and simulate physical systems; etc.

Entity generator block 510 may provide setup information 560 to each of entities 550. In one example, one or more of entities 550 may receive the same or different setup information 560. Setup information 560 may be received from or defined by a user of TCE 240. Setup information 560 may include parameters, configurations, solver settings, etc. for the models of entities 550. The parameters may include information used to describe the models of entities. For example, the parameters may include a parameter to enable block reduction optimization, a parameter to enable Boolean mode, a parameter to specify initial state name or values, etc. The configurations may include information specifying settings to determine a type of solver used by the model, import and export settings, and other values that determine how the model executes. The solver settings may include information enabling selection of a variable-step solver or a fixed-step solver, selection from explicit and implicit solvers, selection of a discrete solver or a continuous solver, etc. As further shown in FIG. 5, entity generator block 510 may provide entities 550 to queue block 520.

Queue block 520 may receive entities 550, and may place entities 550 in a queue. For example, if dynamic system model 500 is a television assembly plant, queue block 520 may place information regarding television components in a queue until the components are needed in the assembly process. An entity 550 may remain in the queue until dynamic system model 500 determines that entity 550 is to be further utilized by dynamic system model 500. Queue block may provide one or more of the entities 550 to event generator block 530 when requested by dynamic system model 500.

Event generator block 530 may receive entities 550, and may generate system events 570 based on information associated with entities 550 and/or based on simulation of dynamic system model 500. System event 570 may include an event that affects dynamic system model 500. For example, if dynamic system model 500 is an interstate highway, system event 570 may include construction closing down one lane of the highway. Alternatively, or additionally, a user of TCE 240 may define system events 570 for event generator block 530. Event generator block 530 may provide system events 570 to one or more entities 550. Entities 550 receiving system events 570 may modify setup information 560 (e.g., the parameters, configurations, solver settings, etc. for the entity models) based on system events 570. Event generator block 530 may provide entities 550 and/or system events 570 to server block 540.

Server block 540 may receive entities 550 and/or system events 570 from event generator block 530, and may receive entity events 580 generated by entities 550. In one example implementation, entity events 580 may be defined by a user of TCE 240. Entity event 580 may include an event that is generated based on changing conditions in an entity model (e.g., an aircraft may load passengers). Entity event 580 may modify behavior of dynamic system model 500. For example, if dynamic system model 500 is an airport and entity event 580 includes a particular aircraft taking off from the airport, entity event 580 may modify dynamic system model 500 by removing entity 550 associated with the particular aircraft.

Server block 540 may generate simulation results 590 based on entities 550, system events 570, and/or entity events 580. Server block 540 may output (e.g., provide for display) and/or store simulation results 590. In one example, simulation results 590 may include code generated from dynamic system model 500. The code may execute multiple simulations of dynamic system model 500 using multiple cores of a single processor, using a local cluster of computing devices, using a remote cluster of computing devices (e.g., a cloud network), etc. Alternatively, or additionally, the code may execute hardware-in-the-loop simulations of dynamic system model 500. For example, some entities 550 may be connected to dynamic system model 500 as physical hardware (e.g., a control system in a vehicle) while other entities 550 may be connected to dynamic system model 500 as simulation entities. Alternatively, all of entities 550 may be connected to dynamic system model 500 as simulation entities.

In one example implementation, TCE 240 may associate dynamic system model 500 with each entity 550 generated and/or modified during simulation of dynamic system model 500. One or more instances of each entity 550 may be provided for dynamic system model 500. For example, entity 550 may be created for a particular aircraft and an airport may include several instances of the particular aircraft. TCE 240 may enable a user to graphically inspect each instance of an associated entity 550 and to step through a simulation of dynamic system model 500 (e.g., in a backward or forward direction).

Although FIG. 5 shows example operations capable of being performed by TCE 240, in other implementations, TCE 240 may perform fewer operations, different operations, and/or additional operations than depicted in FIG. 5. Alternatively, or additionally, one or more components of FIG. 5 may perform one or more other tasks described as being performed by one or more other components of FIG. 5.

Figure 6:
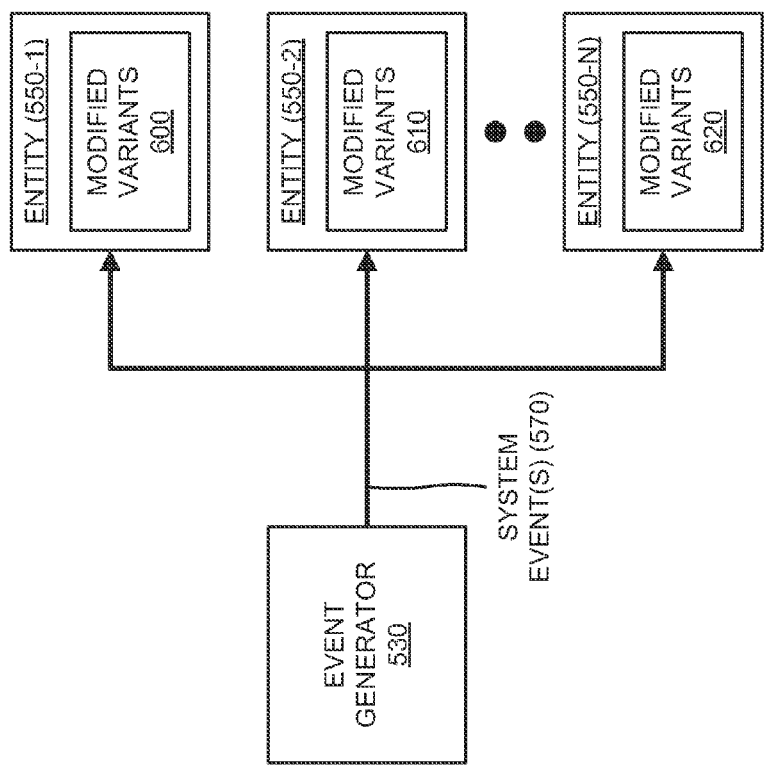
FIG. 6 is a diagram of further example operations capable of being performed by the TCE.

FIG. 6 is a diagram of further example operations capable of being performed by TCE 240. TCE 240 may include the features described above in connection with, for example, one or more of FIGS. 1-5. The functions described in connection with FIG. 6 may be performed by one or more components of device 300 (FIG. 3) and/or by one or more devices 300.

As shown in FIG. 6, event generator block 530 may provide one or more system events 570 to one or more entities 550. As described above, entities 550 receiving system events 570 may modify setup information 560 (e.g., the parameters, configurations, solver settings, etc. for the entity models) based on system events 570. In one example implementation, entities 550 receiving system events 570 may modify one or more variants associated with entities 550. The variants may enable an individual portion (e.g., a block, an element, a component, a module, etc.) of a model (e.g., of entity 550) to have multiple implementations that may be swapped in and out by a user of TCE 240. Within the model, a block (e.g., a subsystem, a model reference, etc.) may have multiple variants that are programmatically controlled. For example, a first entity 550-1 may modify variants associated with the model of first entity 550-1 to create modified variants 600. A second entity 550-2 may modify variants associated with the model of second entity 550-2 to create modified variants 610. An Nth entity 550-N may modify variants associated with the model of Nth entity 550-N to create modified variants 620.

Although FIG. 6 shows example operations capable of being performed by TCE 240, in other implementations, TCE 240 may perform fewer operations, different operations, and/or additional operations than depicted in FIG. 6. Alternatively, or additionally, one or more components of FIG. 6 may perform one or more other tasks described as being performed by one or more other components of FIG. 6.

Example TCE System Model User Interfaces

FIGS. 7-11 are diagrams of example user interfaces 700-1100 capable of being generated by TCE 240 (FIGS. 5 and 6). In one example, user interfaces 700-1100 may correspond to information associated with TCE model 510 and/or entities 550 (FIGS. 5 and 6). User interfaces 700-1100 may include graphical user interfaces (GUIs) or non-graphical user interfaces, such as text-based interfaces. User interfaces 700-1100 may provide information to users via customized interfaces (e.g., proprietary interfaces) and/or other types of interfaces (e.g., browser-based interfaces, etc.). User interfaces 700-1100 may receive user inputs via one or more input devices, may be user-configurable (e.g., a user may change the sizes of user interfaces 700-1100, information displayed in user interfaces 700-1100, color schemes used by user interfaces 700-1100, positions of text, images, icons, windows, etc., in user interfaces 700-1100, etc.), and/or may not be user-configurable. Information associated with user interfaces 700-1100 may be selected and/or manipulated by a user of client device 210 and/or server device 220 (e.g., via a touch screen display, a mouse, a keyboard, a keypad, voice commands, etc.).

Figure 7:
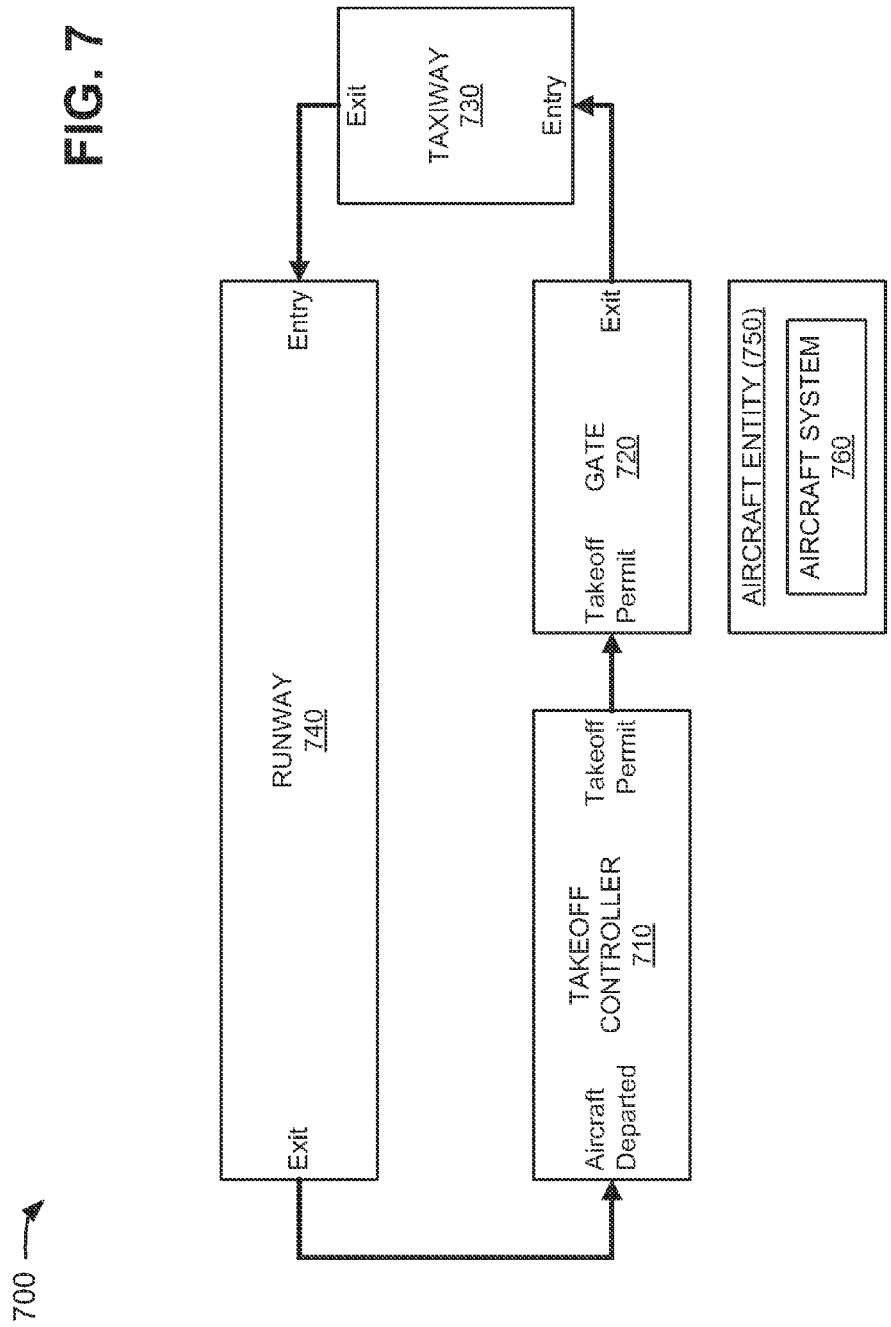
FIGS. 7-11 are diagrams of example user interfaces capable of being generated by the TCE.

As shown in FIG. 7, user interface 700 may include a variety of information associated with dynamic system model 500. For example, user interface 700 may include dynamic system model 500 that simulates an airport management system for an airport. Dynamic system model 500 may include a takeoff controller block 710, a gate block 720, a taxiway block 730, a runway block 740, and information regarding one or more aircraft entities 750.

Takeoff controller block 710 may include a block that simulates an aircraft takeoff management system for the airport. The aircraft takeoff management system may control arrivals and departures of aircraft from the airport. For example, the aircraft takeoff management system may issue a takeoff permit to an aircraft entity 750 located at gate block 720. Takeoff controller block 710 may model aircraft traffic flow as entities (e.g., aircraft entity 750).

Gate block 720 may include a block that simulates a gate at the airport. Aircraft entity 750 may wait at gate block 720 until takeoff controller block 710 issues a takeoff permit for aircraft entity 750. For example, gate block 720 may receive a takeoff permit from takeoff controller block 710, and aircraft entity 750 may exit gate block 720 and move to taxiway block 730 when the takeoff permit is received.

Taxiway block 730 may include a block that simulates a taxiway at the airport. Aircraft entity 750 may enter taxiway block 730 when aircraft entity 750 exits gate block 720. In one example, a topology for taxiway block 730 may be defined using fundamental building blocks. A scheduler may route aircraft entities 750 in taxiway block 730 based on priorities assigned to aircraft entities 750. Aircraft entity 750 may exit taxiway block 730, and enter runway block 740, when runway block 740 is clear for aircraft entity 750.

Runway block 740 may include a block that simulates a runway of the airport. Aircraft entity 750 may enter runway block 740 when aircraft entity 750 exits taxiway block 730. In one example, aircraft entity 750 may enter runway block 740 when aircraft entity 750 is cleared for takeoff from runway block 740. After aircraft entity 750 takes off from the runway, runway block 740 may provide, to takeoff controller block 710, an indication that aircraft entity 750 has departed.

Aircraft entity 750 may include a representation of an individual object (e.g., an aircraft) that may flow through dynamic system model 500 (e.g., the airport management system). Aircraft entity 750 may include an entity model of a particular type. For example, aircraft entity 750 may include an aircraft system model 760. In one implementation, aircraft system model 760 may include a model for aircraft dynamics with pilot behavior (e.g., as described below in connection with FIG. 8), a model for a collision detection system (e.g., as described below in connection with FIG. 9), etc.

Although user interface 700 depicts a variety of information, in other implementations, user interface 700 may depict less information, different information, differently arranged information, and/or additional information than depicted in FIG. 7.

Figure 8:
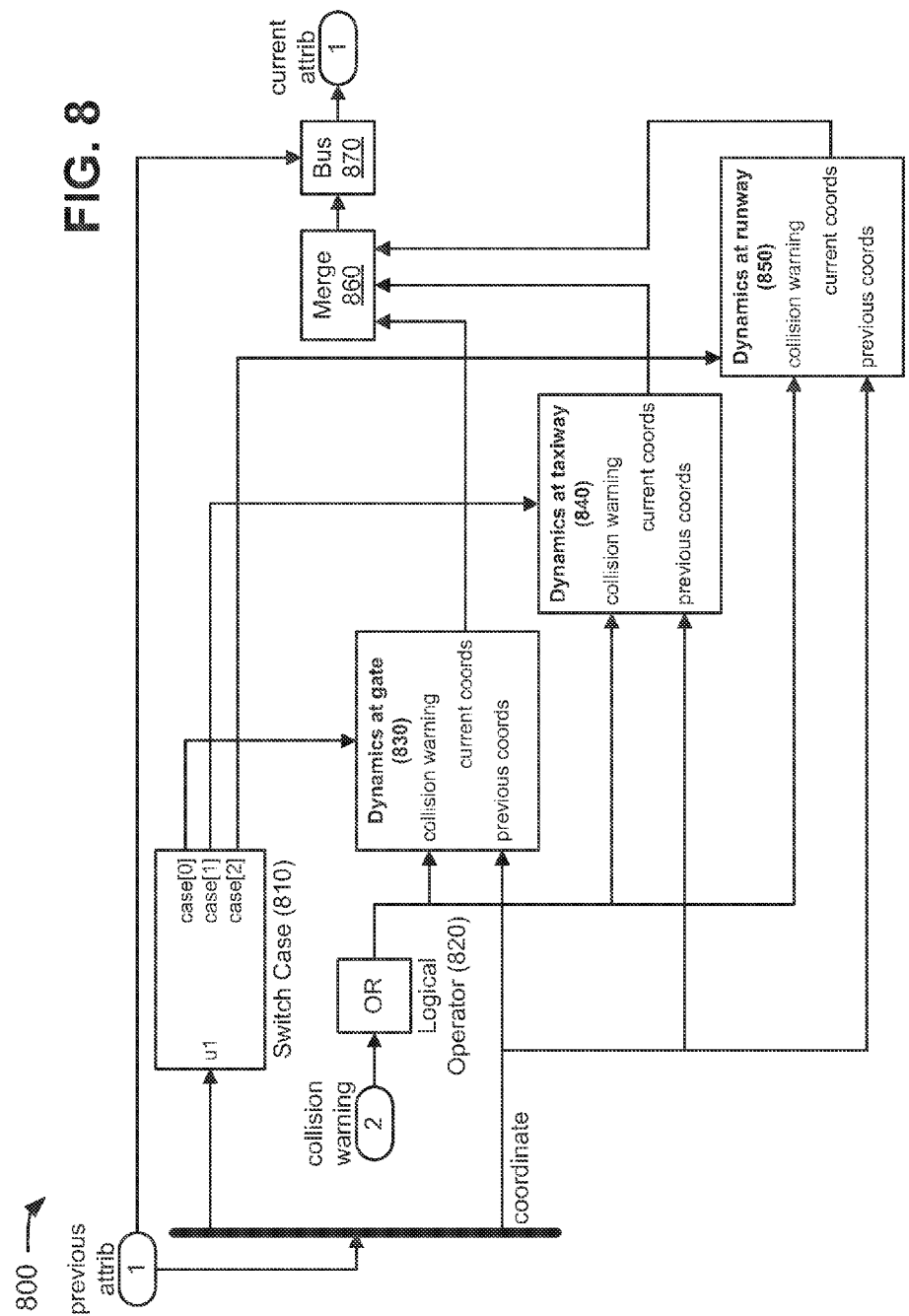

In one example, a user may access user interface 800 by selecting a menu option, by selecting aircraft system model 760, etc. As shown in FIG. 8, user interface 800 may include a variety of information associated with a model (e.g., a Simulink model) for aircraft dynamics with pilot behavior. In one example, the model for aircraft dynamics may include a switch case block 810, a logical operator block 820, a gate dynamics block 830, a taxiway dynamics block 840, a runway dynamics block 850, a merge block 860, and a bus block 870.

Switch case block 810 may include a block that switches between gate dynamics block 830, taxiway dynamics block 840, and runway dynamics block 850 based on a previous attribute (e.g., a location) associated with an aircraft. If the previous attribute indicates that the aircraft is located at a gate (e.g., gate block 720, FIG. 7), switch case block 810 may proceed to gate dynamics block 830. If the previous attribute indicates that the aircraft is located at a taxiway (e.g., taxiway block 730, FIG. 7), switch case block 810 may proceed to taxiway dynamics block 840. If the previous attribute indicates that the aircraft is located at a runway (e.g., runway block 740, FIG. 7), switch case block 810 may proceed to runway dynamics block 850.

Logical block 820 may include an OR block that receives a collision warning for the aircraft, and provides the collision warning to gate dynamics block 830, taxiway dynamics block 840, or runway dynamics block 850 based on where the aircraft is located. If the aircraft is located at the gate (e.g., gate block 720, FIG. 7), logical block 820 may provide the collision warning to gate dynamics block 830. If the aircraft is located at the taxiway (e.g., taxiway block 730, FIG. 7), logical block 820 may provide the collision warning to taxiway dynamics block 840. If the aircraft is located at the runway (e.g., runway block 740, FIG. 7), logical block 820 may provide the collision warning to runway dynamics block 850.

Gate dynamics block 830 may include a block that simulates aircraft dynamics at the gate. Gate dynamics block 830 may receive the collision warning from logical operator 820 and may receive a previous attribute (e.g., previous coordinates) associated with the aircraft. Gate dynamics block 830 may generate current coordinates for the aircraft (e.g., coordinates that avoid a collision) based on the collision warning and the previous coordinates, and may provide the current coordinates to merge block 860.

Taxiway dynamics block 840 may include a block that simulates aircraft dynamics at the taxiway. Taxiway dynamics block 840 may receive the collision warning from logical operator 820 and may receive a previous attribute (e.g., previous coordinates) associated with the aircraft. Taxiway dynamics block 840 may generate current coordinates for the aircraft (e.g., coordinates that avoid a collision) based on the collision warning and the previous coordinates, and may provide the current coordinates to merge block 860.

Runway dynamics block 850 may include a block that simulates aircraft dynamics at the runway. Runway dynamics block 850 may receive the collision warning from logical operator 820 and may receive a previous attribute (e.g., previous coordinates) associated with the aircraft. Runway dynamics block 850 may generate current coordinates for the aircraft (e.g., coordinates that avoid a collision) based on the collision warning and the previous coordinates, and may provide the current coordinates to merge block 860.

Merge block 860 may include a block that receives the current coordinates of the aircraft from gate dynamics block 830, taxiway dynamics block 840, or runway dynamics block 850. Merge block 860 may merge the current coordinates together, and may provide the merged current coordinates to bus block 870.

Bus block 870 may include a block that receives a previous attribute (e.g., a location) associated with the aircraft, and receives the merged current coordinates from merge block 860. Bus block 870 may generate a current attribute (e.g., a current location) associated with the aircraft based on the previous attribute and the merged current coordinates.

Although user interface 800 depicts a variety of information, in other implementations, user interface 800 may depict less information, different information, differently arranged information, and/or additional information than depicted in FIG. 8.

Figure 9:
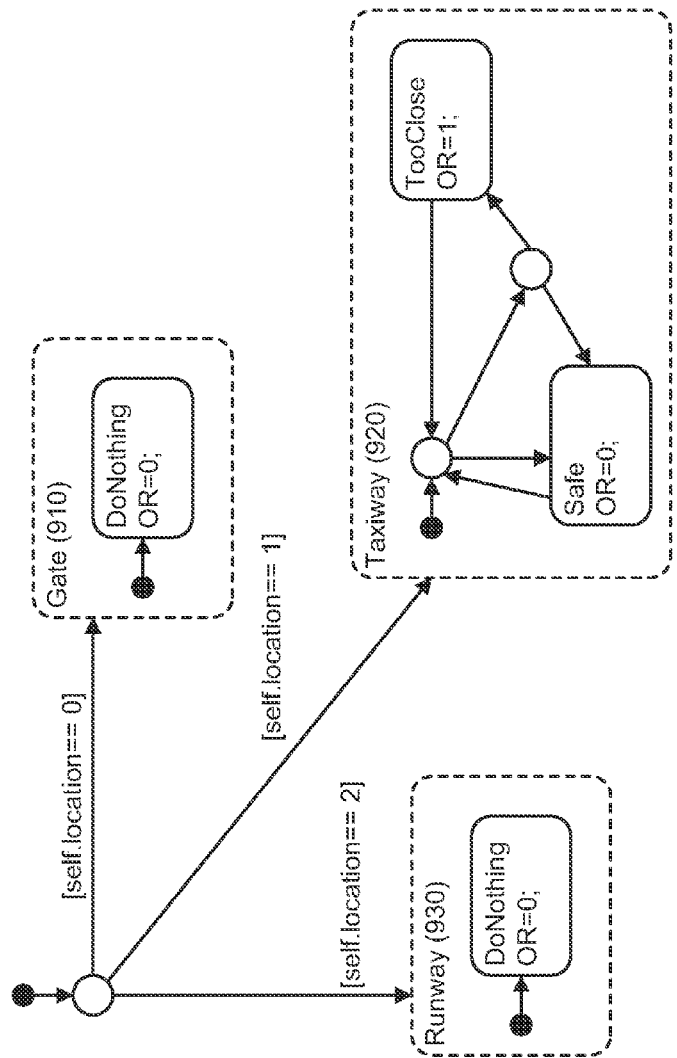

In one example, a user may access user interface 900 by selecting a menu option, by selecting aircraft system model 760, etc. As shown in FIG. 9, user interface 900 may include a variety of information associated with a model (e.g., a Stateflow model) for a collision detection system of an aircraft. In one example, the model for the collision detection system may include a gate block 910, a taxiway block 920, and a runway block 930.

As further shown in FIG. 9, a location associated with the aircraft may be determined by the model. For example, the location may indicate that the aircraft is located at a gate (e.g., gate block 720, FIG. 7), at a taxiway (e.g., taxiway block 730, FIG. 7), or at a runway (e.g., runway block 740, FIG. 7). If the aircraft is located at the gate, the flow may proceed to gate block 910. If the aircraft is located at the taxiway, the flow may proceed to taxiway block 920. If the aircraft is located at the runway, the flow may proceed to runway block 930.

Gate block 910 may include a block that simulates aircraft behavior at the gate. Based on the location of the aircraft at the gate and the locations of other aircraft, gate block 910 may determine whether the aircraft may potentially collide with any of the other aircraft. If there is no potential for a collision (i.e., the aircraft is safe), gate block 910 may do nothing. If there is potential for a collision (i.e., the aircraft is too close to another aircraft), gate block 910 may generate coordinates for the aircraft (e.g., coordinates that avoid a collision).

Taxiway block 920 may include a block that simulates aircraft behavior at the taxiway. Based on the location of the aircraft at the taxiway and the locations of other aircraft, taxiway block 920 may determine whether the aircraft may potentially collide with any of the other aircraft. If there is no potential for a collision (i.e., the aircraft is safe), taxiway block 920 may do nothing. If there is potential for a collision (i.e., the aircraft is too close to another aircraft), taxiway block 920 may generate coordinates for the aircraft (e.g., coordinates that avoid a collision).

Runway block 930 may include a block that simulates aircraft behavior at the runway. Based on the location of the aircraft at the runway and the locations of other aircraft, runway block 930 may determine whether the aircraft may potentially collide with any of the other aircraft. If there is no potential for a collision (i.e., the aircraft is safe), runway block 930 may do nothing. If there is potential for a collision (i.e., the aircraft is too close to another aircraft), runway block 930 may generate coordinates for the aircraft (e.g., coordinates that avoid a collision).

Although user interface 900 depicts a variety of information, in other implementations, user interface 900 may depict less information, different information, differently arranged information, and/or additional information than depicted in FIG. 9.

Figure 10:
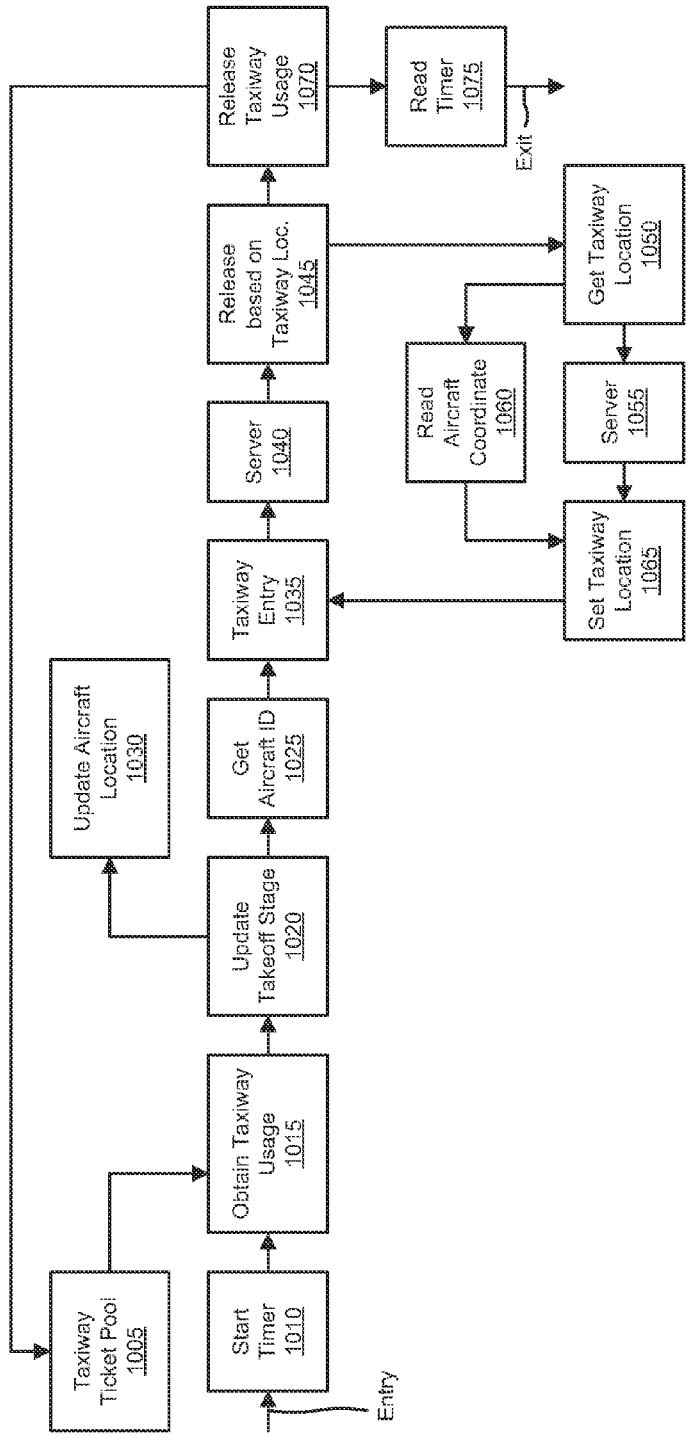

If a user of dynamic system model 500 selects taxiway block 730 (FIG. 7), user interface 1000 (FIG. 10) may be displayed to the user. As shown in FIG. 10, user interface 1000 may include a variety of information associated with taxiway block 730, such as a model (e.g., a SimEvents model) for implementing aircraft dynamics at the taxiway. For example, taxiway block 730 may include a taxiway ticket pool block 1005, a start timer block 1010, an obtain taxiway usage block 1015, an update takeoff stage block 1020, a get aircraft ID block 1025, an update aircraft location block 1030, a taxiway entry block 1035, a server block 1040, a release based on taxiway location block 1045, a get taxiway location block 1050, a server block 1055, a read aircraft coordinate block 1060, a set taxiway location block 1065, a release taxiway usage block 1070, and a read timer block 1075.

Taxiway ticket pool block 1005 may include a block that includes a pool of tickets for aircraft entities 750. The tickets may permit aircraft entities 750 to enter taxiway block 730.

Start timer block 1010 may include a block that starts a timer associated with when a particular aircraft entity 750 enters taxiway block 730. The timer may be used to determine how long the particular aircraft entity 750 has to wait at taxiway block 730 before entering runway block 740.

Obtain taxiway usage block 1015 may include a block that receives a ticket from taxiway ticket pool block 1005. When obtain taxiway usage block 1015 receives the ticket, obtain taxiway usage block 1015 may instruct the particular aircraft entity 750 to enter taxiway block 730.

Update takeoff stage block 1020 may include a block that updates a takeoff stage for the particular aircraft entity 750. For example, update takeoff stage block 1020 may place the particular aircraft entity 750 in a queue (e.g., a takeoff stage) with other awaiting aircraft entities 750.

Get aircraft ID block 1025 may include a block that obtains an identification of the particular aircraft entity 750. The identification may include, for example, a flight number, a serial number, or some other identifier associated with the particular aircraft entity 750.

Update aircraft location block 1030 may include a block that updates a location of the particular aircraft entity 750 based on the takeoff stage received from update takeoff stage block 1020.

Taxiway entry block 1035 may include a block that permits the particular aircraft entity 750 to enter taxiway block 730. In one example, the particular aircraft entity 750 may be provided in a queue associated with taxiway block 730.

Server block 1040 may include a block that serves the particular aircraft entity 750. For example, server block 1040 may move the particular aircraft entity 750 through the queue associated with taxiway block 730.

Release based on taxiway location block 1045 may include a block that permits the particular aircraft entity 750 to exit taxiway block 730. For example, the particular aircraft entity 750 may exit taxiway block 730 and enter runway block 740.

Get taxiway location block 1050 may include a block that obtains a location of the particular aircraft entity 750 in taxiway block 730. For example, the particular aircraft entity 750 may be located in a particular position of the queue associated with taxiway block 730.

Server block 1055 may include a block that updates the location of the particular aircraft entity 750 in taxiway block 730.

Read aircraft coordinate block 1060 may include a block that reads current coordinates associated with the particular aircraft entity 750. Read aircraft coordinate block 1060 may provide the current coordinates to set taxiway location block 1065.

Set taxiway location block 1065 may include a block that sets a location of the particular aircraft entity 750 in taxiway block 730 based on the current coordinates received from read aircraft coordinate block 1060. For example, set taxiway location block 1065 may set the particular aircraft entity 750 in a particular position of the queue associated with taxiway block 730. Information associated with set taxiway location block 1065 may be provided to taxiway entry block 1035.

Release taxiway usage block 1070 may include a block that releases usage of taxiway block 730 by the particular aircraft entity 750. For example, release taxiway usage block 1070 may enable the particular aircraft entity 750 to exit taxiway block 730.

Read timer block 1075 may include a block that stops the timer, started by start timer block 1010, and reads the timer. The timer may be used to determine how long the particular aircraft entity 750 waited at taxiway block 730 before entering runway block 740.

Although user interface 1000 depicts a variety of information, in other implementations, user interface 1000 may depict less information, different information, differently arranged information, and/or additional information than depicted in FIG. 10.

Figure 11:
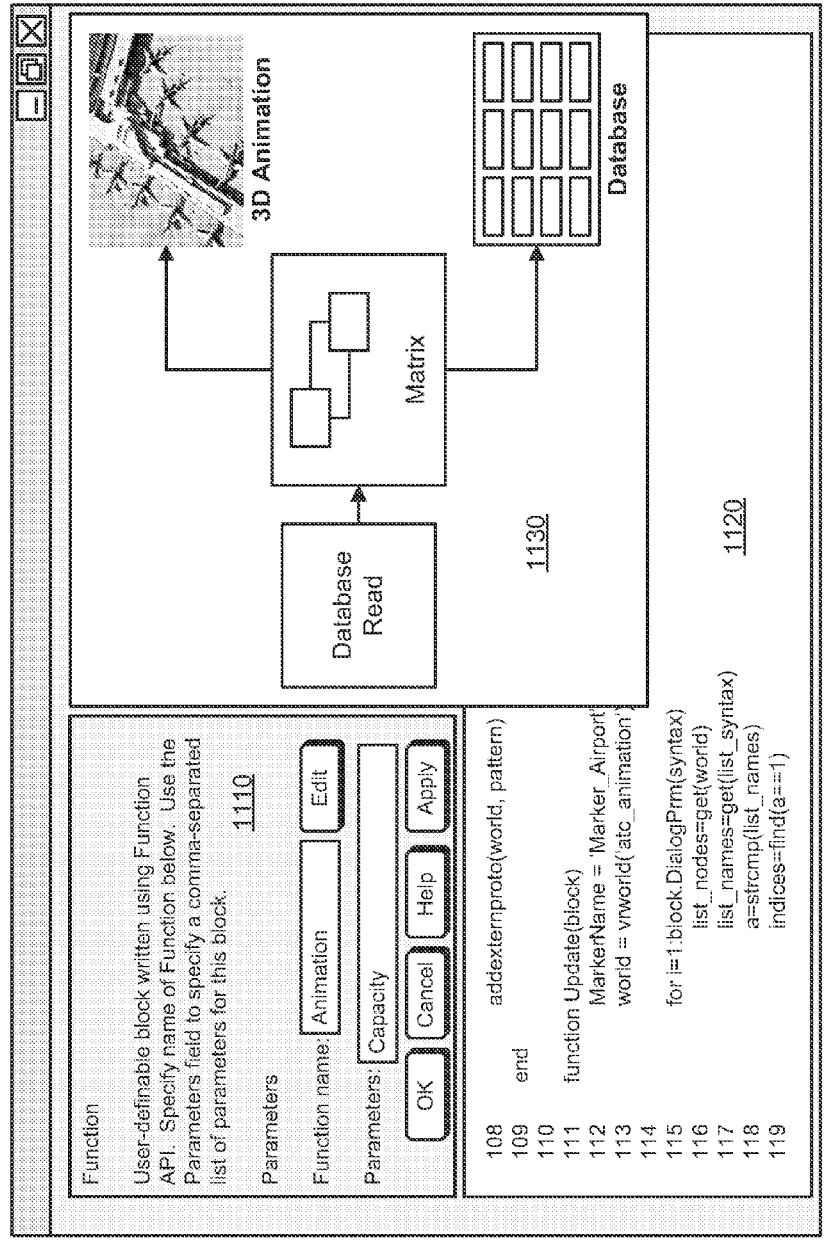

A user of dynamic system model 500 may dynamically create and delete aircraft entities 750 (FIG. 7) using a function (e.g., a MATLAB S-function) and three-dimensional animation (e.g., Simulink three-dimensional animation), via user interface 1100 of FIG. 11. As shown in FIG. 11, user interface 1100 may include a variety of information associated with dynamic system model 500. For example, user interface 1100 may include a function section 1110, a code section 1120, and an animation section 1130.

Function section 1110 may enable a user of dynamic system model 500 to create a user-definable block (e.g., aircraft entities 750) using a function application programming interface (API). Function section 1110 may enable the user to specify a name and a list of one or more parameters for the user-definable block.

Code section 1120 may display code associated with the user-definable block created in function section 1110. In one example, the code may be created by TCE 240 and may be used to create information associated with one or more aircraft entities 750 for dynamic system model 500.

Animation section 1130 may display a three-dimensional (3D) animation associated with the user-definable block created in function section 1110. As shown in FIG. 11, animation section 1130 may display the user-definable block (e.g., a matrix block) and information associated with a database read by the user-definable block to create the three-dimensional animation.

Although user interface 1100 depicts a variety of information, in other implementations, user interface 1100 may depict less information, different information, differently arranged information, and/or additional information than depicted in FIG. 11.

Example Process

Figure 12:
FIGS. 12 and 13 are flow charts of an example process for providing dynamic entities for a model of a graphical modeling environment.
Figure 13:
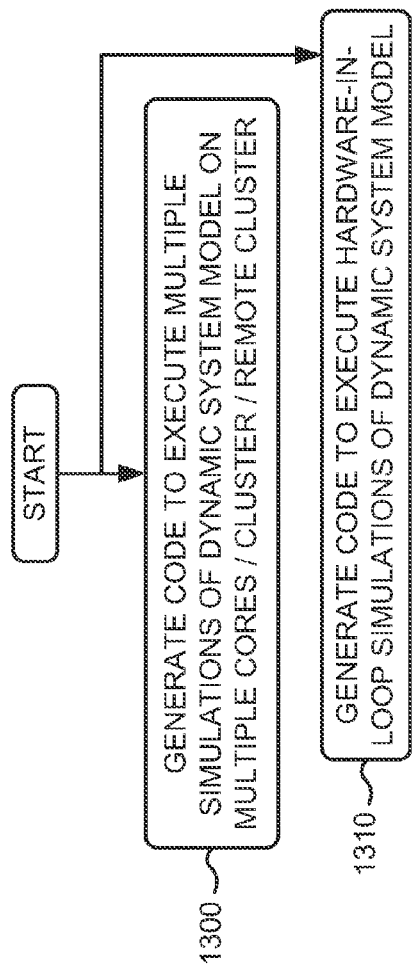

FIGS. 12 and 13 are flow charts of an example process 1200 for providing dynamic entities for a model of a graphical modeling environment. In one implementation, process 1200 may be performed by client device 210 and/or TCE 240. Alternatively, or additionally, process 1200 may be performed by another device or a group of devices separate from or including client device 210 and/or TCE 240, such as server device 220.

As shown in FIG. 12, process 1200 may include receiving and/or creating a dynamic system model for a graphical model environment (block 1210), associating an entity, that includes a model, with the dynamic system model (block 1220), and defining parameters, a configuration, and/or solver settings for the entity model (block 1230). For example, in an implementation described above in connection with FIG. 5, TCE 240 may generate dynamic system model 500. Dynamic system model 500 may include a block diagram model with one or more model elements (e.g., blocks), one or more inputs, and one or more outputs. In one example, dynamic system model 500 may include entity generator block 510, queue block 520, event generator block 530, and server block 540. Entity generator block 510 may generate one or more dynamic entities 550 for dynamic system model 500. Each of entities 550 may include an entity model of a particular type (e.g., model type 1 through model type N). Entity generator block 510 may provide setup information 560 to each of entities 550. Setup information 560 may include parameters, configurations, solver settings, etc. for the models of entities 550. A user may instruct TCE 240 to perform a simulation of dynamic system model 500, or TCE 240 may automatically perform a simulation of dynamic system model 500.

As further shown in FIG. 12, process 1200 may include performing simulation of the dynamic system model (block 1240), generating a system event during simulation of the dynamic system model (block 1250), and modifying the parameters, the configuration, and/or the solver setting for the entity model based on the system event (block 1260). For example, in an implementation described above in connection with FIG. 5, event generator block 530 may receive entities 550, and may generate system events 570 based on information associated with entities 550 and/or based on simulation of dynamic system model 500. System event 570 may include an event that affects dynamic system model 500. Event generator block 530 may provide system events 570 to one or more entities 550. Entities 550 receiving system events 570 may modify setup information 560 (e.g., the parameters, configurations, solver settings, etc. for the entity models) based on system events 570.

Returning to FIG. 12, process 1200 may include generating an entity event during simulation of the dynamic system model (block 1270), modifying the dynamic system model based on the entity event (block 1280), and generating code from the dynamic system model (block 1290). For example, in an implementation described above in connection with FIG. 5, server block 540 may receive entities 550 and/or system events 570 from event generator block 530, and may receive entity events 580 generated by entities 550. Entity event 580 may include an event that is generated based on changing conditions in an entity model (e.g., an aircraft may unload passengers). Entity event 580 may modify behavior of dynamic system model 500. In one example, if dynamic system model 500 is an airport and entity event 580 includes information regarding a particular aircraft taking off from the airport, entity event 580 may modify dynamic system model 500 by removing entity 550 associated with the particular aircraft. Server block 540 may generate simulation results 590 based on entities 550, system events 570, and/or entity events 580. In one example, simulation results 590 may include code generated from dynamic system model 500.

Process block 1290 may include the process blocks depicted in FIG. 13. As shown in FIG. 13, process block 1290 may include one of generating the code to execute multiple simulations of the dynamic system model on multiple cores, a local cluster, and/or a remote cluster (block 1300), or generating the code to execute hardware-in-the-loop simulations of the dynamic system model (block 1310). For example, in an implementation described above in connection with FIG. 5, the code generated by server block 540 may execute multiple simulations of dynamic system model 500 using multiple cores of a single processor, using a local cluster of computing devices, using a remote cluster of computing devices (e.g., a cloud network), etc. Alternatively, or additionally, the code may execute hardware-in-the-loop simulations of dynamic system model 500. In one example, some entities 550 may be connected to dynamic system model 500 as physical hardware (e.g., a control system in a vehicle) while other entities 550 may be connected to dynamic system model 500 as simulation entities. Alternatively, all of entities 550 may be connected to dynamic system model 500 as simulation entities.

CONCLUSION

Systems and/or methods described herein may provide dynamic entities for a dynamic system model of a graphical modeling environment (e.g., a TCE). In one example, the dynamic system model may include blocks that represent an overall dynamic system to be simulated (e.g., an airport, a factory floor, etc.). The dynamic entities may include information regarding individual objects (e.g., an aircraft, a part, a robot, etc.) that may flow through the overall dynamic system. The dynamic entities may include models with parameters, configurations, solver settings, etc. that may be modified by a user of the TCE and/or based on system events (e.g., an airport runway may shut down) generated by the dynamic system model. Alternatively, or additionally, the dynamic entities may generate entity events (e.g., an aircraft may arrive at an airport) that may modify a behavior of the dynamic system model.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 12 and 13, the blocks and/or the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
one or more processors to:
receive a dynamic system model for a graphical modeling environment,
associate an entity with the dynamic system model, the entity including an entity model,
define at least one of a parameter, a configuration, or a solver setting for the entity model,
perform a simulation using the dynamic system model,
generate a system event during the simulation,
modify the at least one of the parameter, the configuration, or the solver setting for the entity model based on the system event,
generate an entity event during the simulation,
the entity event being generated by the entity based on changing conditions in the entity model,
the entity event modifying a behavior of the dynamic system model, and
generate simulation results associated with performing the simulation using the dynamic system model.

2. The device of claim 1, where the system event is generated based on information associated with the entity, and where the one or more processors are further to:
modify the dynamic system model based on the entity event.

3. The device of claim 1, where the one or more processors are further to:
generate code from the dynamic system model,
the simulation results including the code from the dynamic system model.

4. The device of claim 3, where, when generating the code from the dynamic system model, the one or more processors are further to:
generate the code to execute multiple simulations using the dynamic system model on one of:
multiple cores of a single processor,
a local cluster of computing devices, or
a remote cluster of computing devices.

5. The device of claim 3, where, when generating the code from the dynamic system model, the one or more processors are further to:
generate the code to execute a hardware-in-the-loop simulation using the dynamic system model.

6. The device of claim 1, where the entity model includes one of:
a first tool to model systems via state machines and flow charts,
a second tool to model, simulate, and analyze dynamic systems, or
a third tool to model and simulate physical systems.

7. The device of claim 1, where the at least one of the parameter, the configuration, or the solver setting for the entity model is defined by a user of the dynamic system model.

8. A method, comprising:
receiving or creating a dynamic system model for a graphical modeling environment,
the receiving or creating the dynamic system model being performed by one or more devices;
associating an entity with the dynamic system model,
the entity including an entity model,
the associating the entity being performed by the one or more devices;
defining at least one of a parameter, a configuration, or a solver setting for the entity model,
the defining the at least one of the parameter, the configuration, or the solver setting being performed by the one or more devices;
performing a simulation using the dynamic system model,
the performing the simulation being performed by the one or more devices;
generating a system event during the simulation,
the generating the system event being performed by the one or more devices;
modifying the at least one of the parameter, the configuration, or the solver setting for the entity model based on the system event,
the modifying the at least one of the parameter, the configuration, or the solver setting being performed by the one or more devices;
generating an entity event during the simulation,
the entity event being generated by the entity based on changing conditions in the entity model,
the generating the entity event being performed by the one or more devices; and
generating simulation results associated with performing the simulation using the dynamic system model,
the generating the simulation results being performed by the one or more devices.

9. The method of claim 8, further comprising:
modifying the dynamic system model based on the entity event.

10. The method of claim 8, further comprising:
generating code from the dynamic system model,
the simulation results including the code.

11. The method of claim 10, where generating the code from the dynamic system model further comprises:
generating the code to execute multiple simulations using the dynamic system model on one of:
multiple cores of a single processor,
a local cluster of computing devices, or
a remote cluster of computing devices.

12. The method of claim 10, where generating the code from the dynamic system model further comprises:
generating the code to execute a hardware-in-the-loop simulation using the dynamic system model.

13. The method of claim 8, where the entity model includes one of:
- a first tool to model systems via state machines and flow charts,
- a second tool to model, simulate, and analyze dynamic systems, or
- a third tool to model and simulate physical systems.

14. The method of claim 8, where the at least one of the parameter, the configuration, or the solver setting for the entity model is defined by a user of the dynamic system model.

15. One or more non-transitory computer-readable media storing instructions, the instructions comprising:
- one or more instructions that, when executed by a processor of a device, cause the processor to:
   - receive a dynamic system model for a graphical modeling environment,
   - associate an entity with the dynamic system model, the entity including an entity model,
   - define at least one of a parameter, a configuration, or a solver setting for the entity model,
   - perform a simulation using the dynamic system model,
   - generate a system event during the simulation,
      - the system event including an event that affects the dynamic system model,
   - modify the at least one of the parameter, the configuration, or the solver setting for the entity model based on the system event,
   - generate an entity event during the simulation,
      - the entity event being generated by the entity based on changing conditions in the entity model,
      - the entity event modifying a behavior of the dynamic system model, and
   - generate simulation results associated with performing the simulation using the dynamic system model.

16. The one or more non-transitory computer-readable media of claim 15,
   the instructions further comprising:
   - one or more instructions that, when executed by the processor, cause the processor to:
      - modify the dynamic system model based on the entity event.

17. The one or more non-transitory computer-readable media of claim 15, the instructions further comprising:
   - one or more instructions that, when executed by the processor, cause the processor to:
      - generate code from the dynamic system model,
         - the simulation results including the code.

18. The one or more non-transitory computer-readable media of claim 17, the instructions further comprising:
   - one or more instructions that, when executed by the processor, cause the processor to:
      - generate the code to execute multiple simulations using the dynamic system model on one of:
         - multiple cores of a single processor,
         - a local cluster of computing devices, or
         - a remote cluster of computing devices.

19. The one or more non-transitory computer-readable media of claim 17, the instructions further comprising:
   - one or more instructions that, when executed by the processor, cause the processor to:
      - generate the code to execute a hardware-in-the-loop simulation using the dynamic system model.

20. The one or more non-transitory computer-readable media of claim 15, where the entity model includes one of:
- a first tool to model systems via state machines and flow charts,
- a second tool to model, simulate, and analyze dynamic systems, or
- a third tool to model and simulate physical systems.

\* \* \* \* \*